F. BONALI.
HORSESHOE.
APPLICATION FILED APR. 8, 1914.

1,108,125.

Patented Aug. 25, 1914.
2 SHEETS—SHEET 1.

WITNESSES:
Fredk. H. W. Fraentzel
Eva E. Desch.

INVENTOR:
Frank Bonali,
BY
Fraentzel and Richards
ATTORNEYS

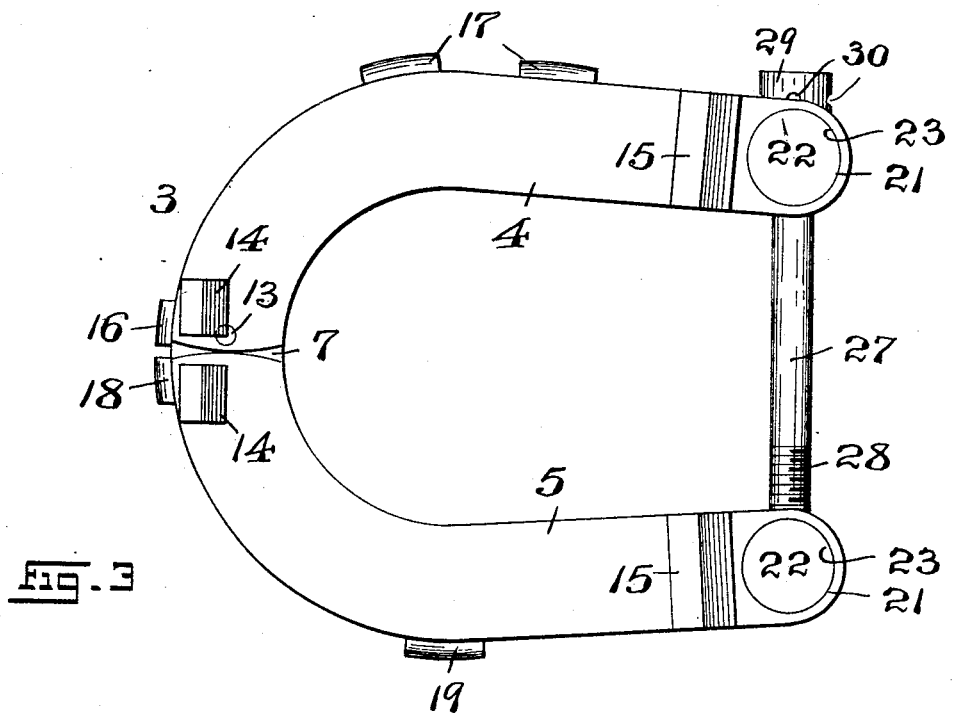
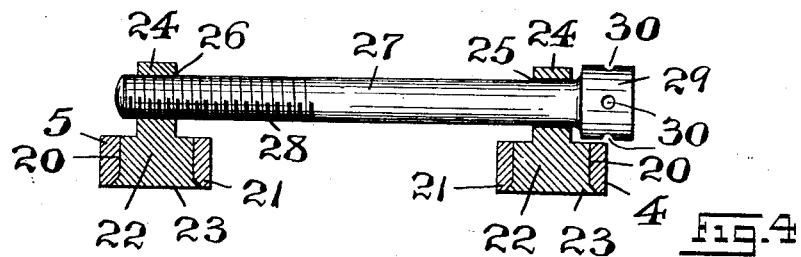
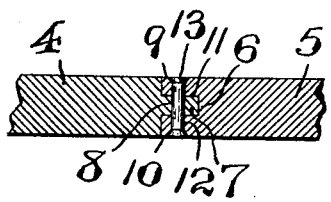

UNITED STATES PATENT OFFICE.

FRANK BONALI, OF CLIFTON, NEW JERSEY, ASSIGNOR OF ONE-FOURTH TO ABBONDIO MACCHIONI, ONE-FOURTH TO PASQUALE PALADINO, AND ONE-FOURTH TO VICTOR OCLAPPO, ALL OF CLIFTON, NEW JERSEY.

HORSESHOE.

1,108,125.  Specification of Letters Patent.  Patented Aug. 25, 1914.

Application filed April 8, 1914. Serial No. 830,502.

*To all whom it may concern:*

Be it known that I, FRANK BONALI, a subject of the King of Italy, residing at Clifton, in the county of Passaic and State of New Jersey, have invented certain new and useful Improvements in Horseshoes; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in horse-shoes; and, the present invention has reference, more particularly, to a novel horse-shoe and a means therefor for detachably securing the horse-shoe either directly to the hoof of a horse's foot, or directly upon the shoe already fastened to the hoof in the ordinary manner by means of the usual nails.

The present invention has for its principal object to provide a novel and simply constructed horse-shoe and means therefor for quickly and easily securing the shoe directly upon the treading surface of the hoof of a horse without the use of nails; and, the invention has for its further object to provide a horse-shoe of the general character hereinafter set forth which can be readily attached directly upon the shoe already secured upon the hoof by means of the usual nails, and is adapted to be just as readily removed, whereby the shoe is admirably adapted for use as an over-shoe upon icy pavements.

Other objects of this invention not at this time more particularly enumerated will be clearly understood from the following detailed description of the present invention.

With the various objects of the present invention in view, the invention consists, primarily, in the novel horse-shoe hereinafter set forth; and, the invention consists, furthermore, in the novel arrangements and combinations of the various devices and parts, as well as in the details of the construction of the said parts, all of which will be more fully described in the following specification, and then finally embodied in the clauses of the claim which is appended to the said specification and forms an essential part of the same.

The invention is clearly illustrated in the accompanying drawings, in which:—

Figure 1:
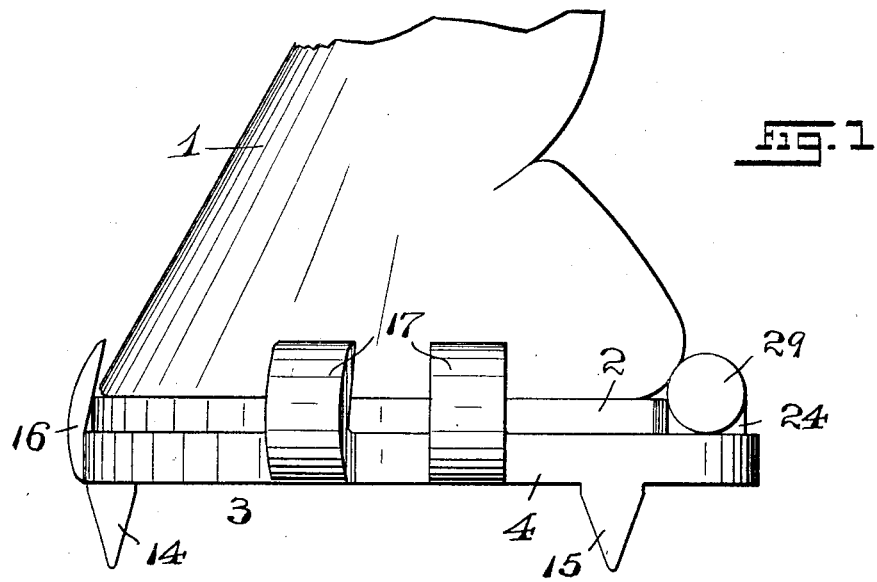
Figure 2:
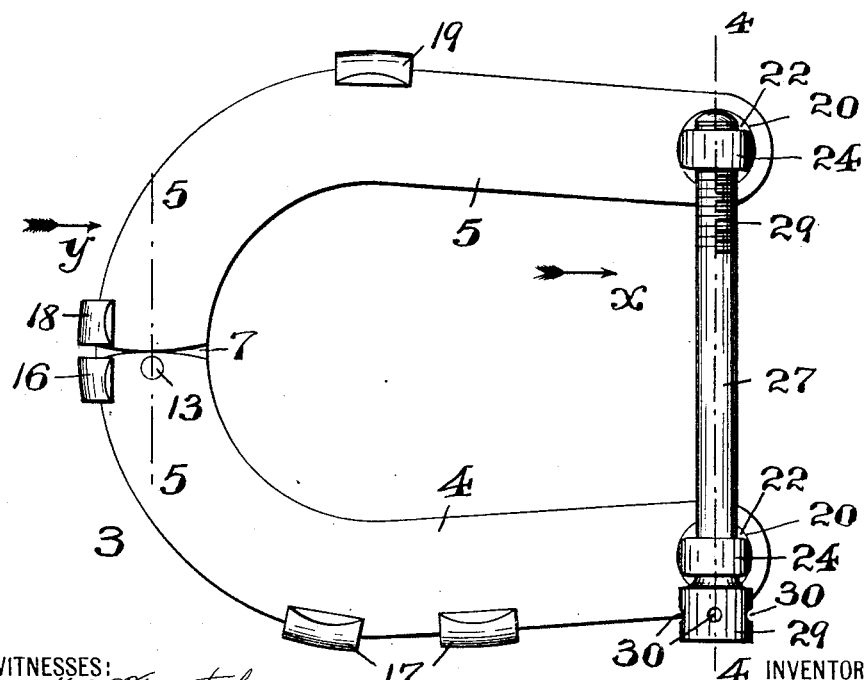

Figure 1 is a side view of the hoof of a horse and the ordinary horse-shoe secured thereto, said view illustrating also in side elevation my novel form of horse-shoe removably attached in its position upon the ordinary horse-shoe and the hoof of the horse, showing one embodiment of the principles of the present invention. Fig. 2 is a top view of the detachable horse-shoe; and Fig. 3 is a bottom view of the same. Fig. 4 is a transverse vertical section of the shoe, said section being taken on line 4—4 in said Fig. 2, looking in the direction of the arrow *x;* and Fig. 5 is a detail transverse vertical section taken on line 5—5 in said Fig. 2, looking in the direction of the arrow *y.*

Similar characters of reference are employed in the said above described views, to indicate corresponding parts.

Referring now to the several figures of the drawings, the reference-character 1 indicates the hoof of a horse, and 2 any usual form of horse-shoe secured to the hoof in the usual manner by means of the ordinary horse-shoe nails.

The shoe which embodies the principles of the present invention is indicated by the reference-character 3, the shoe 3 comprising two suitably-shaped members or elements, as 4 and 5, one of which members is recessed, at the toe-portion, as at 6, and the other member being provided with a tongue, as 7, which is fitted into said recess 6, as shown. The said tongue 7 has a perforation 8, and the parts 9 and 10 of the member 5 are correspondingly perforated. as at 11 and 12, a rivet-pin 13 being arranged in said perforations, substantially as shown in Fig. 5 of the drawings, whereby the two members or elements 4 and 5 are pivotally connected at the toe-portion of the shoe, as will be clearly evident. The said members or elements 4 and 5, may be provided with suitable toe-calks 14 and suitable heel-calks 15, said member 4 being also provided with suitably formed upwardly extending retaining or clamping members 16 and 17, and the member or elements 5 being similarly provided with upwardly extending retaining or clamping members 18 and 19.

As shown in the several figures of the drawings, and more especially in Fig. 4, the heel-portions of the said members 4 and 5 are made with receiving openings, as 20, the said openings being preferably enlarged, as at 21, contiguous to the lower or treading surfaces of the said members 4 and 5. Within the said receiving openings 20 are disposed suitably formed bodies or blocks 22, each block being formed with an enlargement or head 23, so that the said bodies or blocks 22 may be readily fitted in the receiving openings 20 of the respective members 4 and 5, substantially as illustrated in said Fig. 4 of the drawings. As shown, the said blocks or bodies 22 are made with upwardly extending posts 24, one of which has a laterally extending opening 25 having a smooth bore, and the other post having an internally screw-threaded opening 26. Inserted in the opening 25 is a bolt-like stem or rod 27, formed upon one end with screw-threads 28 for screwing the same into the screw-threaded opening 26, and the other end of said bolt or rod 27 having a suitable head 29 provided with receiving sockets or depressions, as 30 for the reception of a spanner wrench, by means of which the bolt or rod 27 may be turned in either direction, so as to bring the two pivotally connected members 4 and 5, when arranged upon the shoe 2, or directly upon the hoof 1, as may be the case, into their clamped relation therewith, or for removing said members 4 and 5 from said shoe 2 or the hoof 1, as may be desired.

The operation of the device will be clearly understood from the foregoing description of the present specification, as well as from an inspection of the several figures of the drawings, and need therefore not be further described.

Of course I am aware that the general construction of the tightening means connected with the heel-portions of the members 4 and 5 may be variously made, and hence I do not limit myself to the exact construction of the same. I am also aware that changes may be made in the general arrangements and combinations of the various devices and parts of the shoe, as well as in the details of the construction of the said parts, without departing from the scope of the present invention as set forth in the foregoing specification, and as defined in the clauses of the claim which is appended thereto. Hence, I do not limit my present invention to the exact arrangements and combinations of the various devices and parts as described in the said specification, nor do I confine myself to the exact details of the construction of the said parts, as illustrated in the accompanying drawings.

I claim:—

1. A horse-shoe comprising a pair of members pivotally connected at the toe-portion of the shoe, said members being provided at their heel-portions with receiving openings, hoof or shoe-engaging clamping means connected with said pivoted members, block-like bodies arranged in the receiving openings of the heel-portions of said pivoted members, perforated posts extending upwardly from said block-like bodies, one of said posts being internally screw-threaded, and the other post having a smooth bore, and a bolt-like stem mounted in said smooth bore of the one post and having a screw-threaded portion adapted to be screwed into the screw-threaded perforation of the other post, substantially as and for the purposes set forth.

2. A horse-shoe comprising a pair of members pivotally connected at the toe-portion of the shoe, said members being provided at their heel-portions with receiving openings, hoof or shoe-engaging retaining elements extending upwardly from the said pivoted members, block-like bodies arranged in the receiving openings of the heel-portions of said pivoted members, perforated posts extending upwardly from said block-like bodies, one of said posts being internally screw-threaded, and the other post having a smooth bore, and a bolt-like stem mounted in said smooth bore of the one post and having a screw-threaded portion adapted to be screwed into the screw-threaded perforation of the other post, substantially as and for the purposes set forth.

In testimony, that I claim the invention set forth above I have hereunto set my hand this 4th day of April 1914.

FRANK BONALI.

Witnesses:
 FREDK. C. FRAENTZEL,
 J. MANGUSI-UNGARO.

---

Copies of this patent may be obtained for five cents each, by addressing the "Commissioner of Patents, Washington, D. C."